United States Patent

Bucourt et al.

[15] 3,697,511
[45] Oct. 10, 1972

[54] NOVEL PROCESS FOR PRODUCING 10-HYDROCARBON-19-NOR-STEROIDS

[72] Inventors: Robert Bucourt; Lucien Nedelec, both of Clichy-sous-Bois, France

[73] Assignee: Roussel Uclaf, Paris, France

[22] Filed: Oct. 20, 1970

[21] Appl. No.: 82,552

Related U.S. Application Data

[63] Continuation-in-part of Ser. No. 714,107, March 18, 1968, abandoned.

[30] Foreign Application Priority Data

March 20, 1967 France.....................6799496
March 4, 1970 France......................7007756

[52] U.S. Cl.................. 260/239.55 R, 260/239.55 C, 260/397.45, 260/397.5, 260/999

[51] Int. Cl...........................................C07c 173/00

[58] Field of Search......./Machine Searched Steroids

[56] References Cited

UNITED STATES PATENTS

2,769,019  10/1956  Herr et al. ............260/397.45

*Primary Examiner*—Henry A. French
*Attorney*—Hammond & Littell

[57] ABSTRACT

A novel process for introducing a 10-hydrocarbon group into a $\Delta^{9(11)}$-19-nor-steroid by reacting a 13$\beta$-lower alkyl-$\Delta^{5(10),9(11)}$-19-nor steroid with a per carboxylic acid to form a mixture of the corresponding 5$\alpha$,10$\alpha$- and 5$\beta$,10$\beta$-epoxy steroids and reacting the latter with a hydrocarbon magnesium halide to form the corresponding 10-hydrocarbon-13$\beta$-lower alkyl-5-hydroxy-$\Delta^{9(11)}$-19-nor-steroid and to novel intermediates.

40 Claims, No Drawings

NOVEL PROCESS FOR PRODUCING 10-HYDROCARBON-19-NOR-STEROIDS

PRIOR APPLICATION 19-nor-$\Delta^{9(11)}$

The present application is a continuation-in-part of our copending, commonly assigned U.S. Patent application, Ser. No. 714,107 filed Mar. 18, 1968, now abandoned.

PRIOR ART

The reason for the interest in the introduction of substituents on to the 10-carbon atom is that it is the key to access to derivative of androstane and pregnane series starting from the corresponding 19-nor steroids, particularly in the total synthesis of steroids, (Velluz et al., Angew. Chem. col. 77, 1965, p. 185–205). It also opens a means to prepare new steroids having a substituent other than methyl at the 10- or 13- positions.

Methods for preparing androstane or pregnane derivatives having substituents other than methyl at the 10- position are known. For example, to form $10\beta$-ethyl-19-nor-testosterone, Halpern et al., (Chem. and Ind., 1963, p. 116), started from $3\beta$-acetoxy-$5\alpha$-bromo-$6\beta$, 19-oxido-androstane-17-one and converted it into its 17-ethylene ketal derivative. The bromo-oxido group was then split to form $3\beta$-acetoxy-17-ethylenedioxy-$\Delta^5$ androstene-19-ol which was oxidized to form the corresponding 19-one-steroid. The latter compound was subjected to a Wittig reaction with triphenylmethylene phosphorene to form $3\beta$-acetoxy-17-ethylenedioxy-19-methylene-$\Delta^5$-androstene which was acid treated and reacetylated to form $3\beta$-acetoxy-19-methylene-$\Delta^5$-androstene-17-one. The latter compound was subjected to an alkali hydrolysis and then was catalytically hydrogenated to form 19-methyl-$\Delta^5$-androstene-$3\beta$-ol-17-one. The product was then subjected to an Oppenauer oxidation, reduction with lithium aluminum hydride and finally reaction with dichlorodicyanobenzoquinone to form $10\beta$-ethyl-19-nor-testosterone or 19-methyl testosterone. This synthesis is very long and difficult.

OBJECTS OF THE INVENTION

It is an object of the invention to provide a novel simplified process for introducing 10-hydrocarbon substituents in 19-nor-$\Delta^{9(11)}$-steroids.

It is a further object of the invention to provide a novel step for selectively introducing a 10-hydrocarbon group in to a 5,10-epoxy-19-nor-steroid.

It is an additional object of the invention to provide novel intermediates formed in the novel process.

These and other objects and advantages of the invention will become obvious from the following detailed description.

THE INVENTION

The novel process of the invention for the preparation of 10-hydrocarbon-$13\beta$-lower alkyl-19-nor-$\Delta^{9(11)}$-steroids comprises reacting a $13\beta$-lower alkyl-19-nor-$\Delta^{5(10),9(11)}\beta$-steroid steroid with a peracid to form a mixture of $5\beta,10\beta$-epoxy-19-nor-$\Delta^{9(11)}\beta$-lower alkyl-19-nor-$\Delta^{9(11)}$-steroid, which may be separated if desired, and reacting the latter, in which any ketone groups being present are protected, with a hydrocarbon magnesium reagent to form the corresponding 5-hydroxy-10-hydrocarbon-$13\beta$-lower alkyl-19-nor-$\Delta^{9(11)}$-steroid.

The 10-hydrocarbon substituent may be selected from the group consisting of alkyl of one to seven carbon atoms such as methyl, ethyl, propyl, butyl, etc; alkenyl of two to seven carbon atoms such as allyl, vinyl, etc.; aryl such as phenyl, tolyl, etc.; aralkyl such as benzyl, phenethyl, tolylmethyl, etc., and the said radicals having at least one substituent selected from the group consisting of halogen, alkoxy of one to seven carbon atoms and aryloxy.

The novel process of the invention has two essential steps, the first of which is the epoxidation of a 13-$\beta$-alkyl-19-nor-$\Delta^{5(10),9(11)}$-steroid by reaction with a per acid which forms predominantly the corresponding bitertiary epoxides at the 5,10-position. This result could not be predicted since it was not obvious that there would be formed predominantly the 5,10-epoxide, rather than the 9,11-epoxide.

The second step of the invention resides in the opening of the 5,10-epoxy group of 19-nor-$\Delta^{9,(11)}$-steroid with simultaneous introduction of a hydrocarbon substituent at the 10-position by reaction with the desired hydrocarbon-magnesium reagent, preferably a halide other than fluoride. The presence of the $\Delta^{9(11)}$-double bond unexpectedly provides a very easy opening of the oxide bridge in the $5\alpha,10\alpha$-epoxide leading to a high yield of the corresponding $10\beta$-hydrocarbon derivative and also gives an exclusive, unexpected introduction of the hydrocarbon substituent at the 10-position for the $5\beta,10\beta$-epoxide compound. These results were particularly surprising since it was known that with a $5\beta,10\beta$-epoxide, addition thereto was transdiaxial resulting in a $5\alpha,10\beta$-addition product with the hydrocarbon being at the 5-position.

The starting steroids for the process of the invention are 19-nor-$\Delta^{5(10),9(11)}$-steroids of the androstane or pregnane series having an alkyl of one to six carbon atoms in the 13-position and may have at the 3-position a substituent selected from the group consisting of = O, dilower alkoxy, lower alkylenedioxy, hydroxy, alkoxy, acyloxy and RON= in which R is hydrogen or lower alkyl and may have at the 17-position a substituent selected from the group consisting of = O, dilower alkoxy, lower alkylenedioxy, hydroxy, lower alkoxy, acyloxy, $\beta$-acetyl, RON= where R is hydrogen or lower alkyl

where R' is a saturated or unsaturated hydrocarbon which may be substituted and

wherein R" is an easily hydrolyzable group such as trimethylsilyl.

The epoxidation reaction is preferably effected in an inert organic solvent such as aromatic hydrocarbon such as benzene, toluene, etc.; a halogenated hydrocarbon such as methylene chloride, dichloroethane, etc.; and ethers such as ethyl ether, tetrahydrofuran, etc. The peracid is preferably a per carboxylic acid such as perphthalic acid, per-p-nitrobenzoic acid, perbenzoic acid, performic acid, peracetic acid, etc. The 5-hydroxy-10-hydrocarbon steroids formed by the process may be converted in a known manner into a $\Delta^4$-steroid.

In the 5,10-epoxy steroids, it is the $\Delta^{9(11)}$-double bond which makes the 10-carbon atom susceptible to nucleophilic attacks whether the epoxide is $\alpha$— or $\beta$—. The reaction of the organo-magnesium halide with 5,10-epoxide leads principally to the 5,10-trans-disubstituted derivative and the configuration of the epoxide determines the orientation of the 5- and 10-positions. Therefore, the $5\alpha,10\alpha$-epoxide provides principally the $5\alpha$-hydroxy-$10\beta$-hydrocarbon derivative and the $5\beta,10\beta$-epoxide yields principally the $5\beta$-hydroxy-$10\alpha$-hydrocarbon derivative. This access to either one of the $10\alpha$- or $10\beta$-isomers gives an additional interest to the process of the invention.

The hydrocarbon-magnesium reagent of the process is the halide other than the fluoride and the reaction of the epoxide therewith is preferably effected in an inert organic solvent such as an ether such as ethyl ether, isopropyl ether, tetrahydrofuran, etc., or an aromatic solvent such as benzene, toluene, etc.

The 5-hydroxy-10-hydrocarbon steroids produced by the process of the invention may be easily converted into the corresponding 10-hydrocarbon-$\Delta^4$-steroid. For example, a 3-ketal-5-hydroxy-10-hydrocarbon-$\Delta^{9(11)}$-steroid can be treated with an acid agent to split off the ketals present and a molecule of water and form the corresponding 3-oxo-10-hydrocarbon-$\Delta^{4,9(11)}$-steroid. The oxo groups are preferably protected by cyclic ketals such as ethylene ketal, a non-cyclic ketal such as dimethyl ketal or an oximido group such as HON=.

In this way, 9,11-dehydrotestosterone can be prepared starting from 3-ethylene-dioxy-$10\beta$-methyl-$\Delta^{9(11)}$-estraene-$5\alpha,17\beta$-diol. Analogously, when the hydrocarbon substituent at the 10-position is an ethyl, propyl or allyl radical, the corresponding derivatives of 9,11-dehydrotestosterone are obtained. Moreover, one can prepare, starting from 3-ethylenedioxy-$10\beta$-methyl-$13\beta$-n-propyl-$\Delta^{9(11)}$-gonaene-$5\alpha,17\beta$-diol, $10\beta$-methyl-$13\beta$-n-propyl-$\Delta^{4,9(11)}$-gonadiene-$17\beta$-ol-3-one. Likewise, in an analogous way, but starting from 3-ethylenedioxy-$10\alpha$-methyl-$\Delta^{9(11)}$-estraene-$5\beta,17\beta$-diol, 10-iso-9(11)-dehydrotestosterone is obtained. In addition, it is obvious to one skilled in the art, when the 5-hydroxy-10-hydrocarbon derivative carries a hydroxyl function at the 3-position, it will be convenient, if one wishes to create the 3-oxo-$\Delta^4$ sequence, to oxidize the said function and then to subject the compound thus formed to the action of an acid agent.

When the starting $\Delta^{9(11)}$-steroid has a $17\beta$-cyano and a $17\alpha$-hydroxy group, the compound after protection of the $17\alpha$-hydroxyl group with an easily hydrolyzable group such as trimethylsilyl can be reacted with an agent such as methyl magnesium bromide to form the corresponding $\Delta^{9(11)}$-pregnene-$5\alpha,17\alpha$-diol-20-one as this permits addition of the hydrocarbon at the 10-position and to the carbon atom of the $17\beta$-cyano group.

In the following examples, there are described several preferred embodiments to illustrate the invention. However, it should be understood that the invention is not intended to be limited to the specific embodiments.

EXAMPLE I

Preparation of 3-ethylenedioxy-$5\alpha,10\alpha$-epoxy-$17\beta$-benzoyloxy-$\Delta^{9(11)}$-estraene and of 3-ethylenedioxy-$5\beta,10\beta$-epoxy-$17\beta$-benzoyloxy-$\Delta^{9(11)}$-estraene 20 g. of 3-ethylenedioxy-$17\beta$-benzoyloxy-$\Delta^{5(10),9(11)}$-estradiene (prepared by the process described in French Pat. No. 1,334,935), were dissolved under an atmosphere of nitrogen in a mixture of 160 cc of benzene and 40 cc of dichloroethane. The mixture was cooled to +5° C. and a concentrated solution of perphthalic acid in ether (excess of 20 percent) were added thereto over about 5 minutes. The solution was agitated overnight at +5° C. and the insolubles formed were filtered off. The filtrate was poured into an aqueous solution of sodium bicarbonate and the organic phase was decanted off and the aqueous phase was extracted with methylene chloride. The methylene chloride extracts were added to the main organic phase and the organic phase was washed with water, dried and concentrated to dryness.

The residue was chromatographed on silica gel and the column was eluted with a mixture of benzene and ethyl acetate containing 0.2 percent triethylamine to isolate two main fractions, (A and B), of which the more important (A) was the $5\alpha,10\alpha$-epoxide derivative. This fraction was recrystallized from ethanol to obtain 6.04 g. of 3-ethylene-dioxy-$5\alpha,10\alpha$-epoxy-$17\beta$-benzoyloxy-$\Delta^{9(11)}$-estraene having a melting point of 161° C. A second crystallization from ethanol did not change the melting point, its specific rotation was $[\alpha]_D^{20} = +5°$ ($c = 0.6$ percent in chloroform) and $[\alpha]_D^{20} = +7.4°$ ($c = 0.5$ percent in pyridine).

Analysis: $C_{27}H_{32}O_5$; molecular weight = 436.53
Calculated: C% 74.28 H% 7.39
Found 74.3 7.3
U. V. Spectrum (ethanol) $\lambda$max. 229–230 m$\mu$ $\epsilon$ = 14,770
$\lambda$max. 267 m$\mu$ $\epsilon$ = 800
$\lambda$max. 273 m$\mu$ $\epsilon$ = 915
$\lambda$max. 280 m$\mu$ $\epsilon$ = 725

The other fraction (B) (2.55g) was the $5\beta,10\beta$-epoxide and the product was recrystallized from ethanol to obtain 1.8 g. of 3-ethylenedioxy-$5\beta,10\beta$-epoxy-$17\beta$-benzoyloxy-$\Delta^{9(11)}$-estraene having a melting point of 181°C and a specific rotation $[\alpha]_D^{20} = -17.6°$ (c = 0.5 percent in pyridine).
Analysis: $C_{27}H_{32}O_5$; in molecular weight = 436.53
Calculated: C% 74.28 H% 7.39
Found: 74.5 7.5
U. V. Spectrum (ethanol)
$\lambda$max. at 230 m$\mu$ $\epsilon$ = 14,700
inflexion at about 266–267 m$\mu$ $\epsilon$ = 840
$\lambda$max. at 273 m$\mu$ $\epsilon$ = 980
$\lambda$max. at 280 m$\mu$ $\epsilon$ = 830
inflexion at about 297 m$\mu$ $\epsilon$ = 160

The two epoxides are not described in the literature.

EXAMPLE II

Preparation of $\Delta^{4,9(11)}$-androstadiene-$17\beta$-ol-3-one

1. Opening of the Epoxide.

1.75 g of 3-ethylenedioxy-$5\beta,10\alpha$-epoxy-$17\beta$-benzoyloxy-$\Delta^{9(11)}$-estraene were introduced into 55 cc of 0.67N solution of methyl magnesium bromide in tetrahydrofuran under an atmosphere of nitrogen at +10° C. and the reaction mixture was agitated for three hours at ambient temperature. The mixture was poured into an aqueous solution of ammonium chloride containing ice and the organic phase was separated by decanting. The aqueous phase was extracted with methylene chloride and the combined methylene chloride extracts combined with the organic phase and the whole was washed with an aqueous solution of sodium chloride, dried and evaporated to dryness. The residue was recrystallized from isopropyl ether to obtain 0.808 g of crude 3-ethylenedioxy-$\Delta^{9(11)}$-androstaene-$5\alpha,17\beta$-diol having a melting point of 164°–165° C. The ethereal mother liquors of crystallization were retained as mother liquors A. A sample of product was recrystallized from isopropanol and then from a mixture of ethyl acetate and isopropyl ether to obtain the product with a melting point of 168°–169° C. and a specific rotation $[\alpha]_D^{20}$ of −10° ($c = 0.7\%$ in chloroform).

Analysis: $C_{21}H_{32}O_4$; molecular weight = 348.47
Calculated: C% 72.37 H% 9.26
Found: 72.4 9.4
I.R. Spectrum (chloroform):
Free OH 3,600 cm$^{-1}$
Associated OH at 3,486 cm$^{-1}$
NMR (CD Cl$_3$)
18-methyl at       42 Hz
19-methyl at       68 Hz
H$_{17}$ at about    225 Hz
Ketal at     239 Hz
H$_{11}$ at about    321 Hz This compound is not described in the literature.

2. Hydrolysis of the ketal 0.4 g of crude 3-ethylenedioxy-$\Delta^{9(11)}$-androsta-ene-$5\alpha,17\beta$-diol, melting point of 164°–165° C. were introduced into 5 cc of methanol and 1 cc of aqueous 5N hydrochloric acid under an atmosphere of nitrogen and the mixture was refluxed for 15 minutes, then cooled and diluted with water and filtered in vacuo. The precipitate thus formed was washed with water and dried to obtain 0.34 g of solvated $\Delta^{4,9(11)}$-androstadiene-17$\beta$-ol-3-one having a melting point of 105° C., then 157° C.

A sample of this product was crystallized from isopropyl ether to obtain a product with a melting point of 157° C. and a specific rotation $[\alpha]_D^{20} = +92°$ ($c = 0.5\%$ in chloroform).
U.V. Spectrum (ethanol)
$\lambda$max. at 239–420 m$\mu$ $\epsilon$= 16,700

This product was identical to a sample of $\Delta^{4,9(11)}$-androstadiene-17$\beta$-ol-3-one prepared by another route.

The ethereal mother-liquors A were concentrated to dryness and the residue was hydrolyzed with methanolic hydrochloric acid as indicated above and the product was purified by chromatography on silica to obtain 0.280 g of $\Delta^{4,9(11)}$-androstadiene-17$\beta$-ol-3-one of the same quality as the product previously obtained.

EXAMPLE III

Preparation of 10$\beta$-ethyl-$\Delta^{4,9(11)}$-estradiene-17$\beta$-ol-3-one

1. Opening of the epoxide.

60 cc of tetrahydrofuran were introduced into 45 cc of ethereal 0.8N solution of ethyl magnesium bromide and the ether was distilled off. The solution was cooled to 15° C. and under an atmosphere of nitrogen, 1.75 g of 3-ethylene-dioxy-$5\alpha,10\alpha$-epoxy-17$\beta$-benzoyloxy-$\Delta^{9(11)}$-estraene was added thereto and the mixture was agitated for two hours at ambient temperature. The reaction mixture was poured into an aqueous solution of ammonium chloride containing ice and the solution was extracted with methylene chloride and the organic extracts were washed with salt water, dried and evaporated to dryness. The residue was re-crystallized from isopropyl ether to obtain 1.012 g of crystals and the ethereal mother liquors of crystallization were retained as mother liquors 3. The said crystals were recrystallized from ethyl acetate then from a mixture of ethyl acetate and isopropyl ether to obtain 0.935 g. of 3-ethylenedioxy-10$\beta$-ethyl-$\Delta^{9(11)}$-estraene-$5\alpha,17\beta$-diol having a melting point of 200°–201° C.

A sample of this product was recrystallized from an ethyl acetate/isopropyl ether mixture to obtain pure product having a melting point of 201-202°C and a specific rotation $[\alpha]_D^{20} = -9.7°$ ($c = 0.6\%$ in chloroform).
Analysis: $C_{22}H_{34}O_4$; molecular weight = 362.49
Calculated: C% 72.89 H% 9.45
Found: 72.6 9.5
I. R. Spectrum
Free OH at 3,600 cm$^{-1}$
Associated OH at 3,490 cm$^{-1}$
NMR (CD Cl$_3$)
18-methyl at 43 Hz
methyl of the ethyl group triplet at 33; 40.4; 47 Hz
methylene of the ethyl group at about 110–120 Hz
H$_{17}$ at about 226 Hz
ketal at 238.8 Hz
H$_{11}$ coupled at about 319 Hz This compound is not described in the literature.

2. Hydrolysis of the ketal 0.99 g. of 3-ethylenedioxy-10$\beta$-ethyl-$\Delta^{9(11)}$-estraene-$5\alpha,17\beta$-diol were introduced into 10 cc of methanol admixed with 2 cc of aqueous 5N hydrochloric acid and the mixture was heated at reflux for 15 minutes. The mixture was cooled, diluted with water and filtered in vacuo. The precipitate thus formed was dried to obtain 0.81 g of monohydrated 10$\beta$-ethyl-$\Delta^{4,9(11)}$-extradiene-17$\beta$-ol-3-one having a melting point of about 95° C., then 112°–114° C.

A sample of this product was recrystallized from aqueous methanol and had a melting point of about 100° C., then 112°–114° C. and a specific rotation of $[\alpha]_D^{20} = +56°$ ($c = 0.3$ percent in methanol) and $[\alpha]_D^{20} = +62°$ ($c = 0.4$ percent in chloroform). This product was solvated with water.

Analysis: $C_{20}H_{28}O_2$; molecular weight = 300.42 (product dried at 100° C.)

Calculated:    O% 79.95    H% 9.39
Found:            79.7              9.5

I. R. Spectrum (CHCl$_3$)
Free OH at 3,600 cm$^{-1}$
associated OH at 3,415 cm$^{-1}$
conjugated ketone at 1,670 and 1,654 cm$^{-1}$
U. V. Spectrum (ethanol)
$\lambda$max. at 240–241 m$\mu$ $\epsilon$= 16,450

The ethereal mother liquors B were concentrated to dryness and the residue was hydrolyzed in methanolic hydrochloric acid according to the method described above. Then the product obtained was purified by chromatography on silica gel to obtain 0.166 g of 10$\beta$-ethyl-$\Delta^{4,9(11)}$-estradiene-17$\beta$-ol-3-one of the same quality as the product already isolated. 10β-ethyl-Δ$^{4,9(11)}$-estradiene-17β-ol-3-one is not described in the literature, and has androgenic and anabolizing properties.

EXAMPLE IV

Preparation of 10-iso-9,11-dehydrotestosterone

1. Opening of the epoxide 3.05 g of 3-ethylenedioxy-5β,10β-epoxy-17β-benzoyloxy-Δ$^{9(11)}$-estraene having a melting point of 181° C. and a specific rotation $[\alpha]_D^{20} = -17.6°$ (pyridine) were added to a solution consisting of 48.5 c.c. of 1.3N methyl magnesium bromine in tetrahydrofuran and 50 cc of anhydrous tetrahydrofuran. The reaction mixture under an atmosphere of nitrogen was agitated for one hour at ambient temperature and then heated at reflux for 45 minutes. After cooling, the mixture was poured into an aqueous solution of ammonium chloride and ice. The solution was extracted with methylene chloride and the extracts were washed with salt water and then with pure water, dried and evaporated to dryness in vacuo. The residue was dissolved in 7 cc of methanol, the solution stood in an ice-box at 0° C. overnight to obtain 0.874 g of 3-ethylenedioxy-10α-methyl-Δ$^{9(11)}$-estraene-5β,17β-diol having a melting point of about 160° C.

The mother liquor of crystallization is chromatographed on silica and elution with chloroform containing 10 percent acetone isolated 0.386 g of 3-ethylenedioxy-Δ$^{9(11)}$-androstaene-5β,17β-diol and 0.517 g of 3-ethylenedioxy-Δ$^{1(10),9(11)}$-estradiene-5β,17β-diol. As far as is known, these two compounds are not described in the literature. The Δ$^{9(11)}$-androstaene derivative may be converted by the process of Example II into Δ$^{4,9(11)}$-androstadiene-17β-ol-3-one.

3-ethylenedioxy-10α-methyl-Δ$^{9(11)}$-estraene-5β,17β-diol having a melting point of 160° C., was purified by recrystallization from a chloroform/methanol mixture (1:5) to obtain about 0.5 g of product having a melting point of 150°–152° C., then 166°–167° C. which occurred in the form of colorless crystals. The crystals were soluble in cold benzene and chloroform and in hot alcohols, were slightly soluble in ether and insoluble in water.

Analysis: $C_{21}H_{32}O_4$; molecular weight = 348.47

| | C% | H% |
|---|---|---|
| Calculated: | 72.37 | 9.26 |
| Found: | 72.2 | 9.2 |

NMR (CD Cl$_3$)
18-methyl at 45.7 Hz
19 methyl at 65.2 Hz
OH at 5 at 250 Hz (chelated)
H$_{11}$ at about 323.5 Hz
H$_{17}$ at about 225 Hz
ketal at 238.5 Hz
This compound is not described in the literature. 2. Hydrolysis 0.69 g of 3-ethylenedioxy-10α-methyl-Δ$^{9(11)}$-estraene-5β,17β-diol were added to a mixture of 9 cc of ethanol and 1.4 cc of aqueous 5N hydrochloric acid under an atmosphere of nitrogen and the mixture was heated at reflux for 15 minutes. The solution was then concentrated to a small volume and poured into water and left overnight at 0° C. The mixture was filtered in vacuo and the precipitate thus formed was recrystallized from ethyl acetate to obtain 0.49 g of 10α-methyl-Δ$^{4,9(11)}$-estradiene-17β-ol-3-one (or 10-iso-9,11-dehydrotestosterone) having a melting point of 149°–150° C. and a specific rotation $[\alpha]_D^{20} = -133.8°$ (c = 1.2 percent in chloroform).

This product is not described in the literature. It is an anabolizing agent.

This compound was used as starting material for obtaining 10-iso-9,11-dehydroprogesterone after protection of the ketone at 3, by oxidation (Oppenauer) at the 17-position and introduction of the lateral chain by means of a Wittig's reagent. The 10-iso-9,11-dehydroprogesterone thus obtained had a melting point of 164°–167° C. and was identical with a sample of the same compound prepared by another route.

EXAMPLE V

Preparation of Δ$^{4,9(11)}$-androstadiene-17β-ol-3-one

Step A: Epoxidation 0.943 g of 3 ethylenedioxy-Δ$^{5(10),9(11)}$-estradiene-17-one (described in French Pat. No. 1,336,083) were dissolved in 13cc of methylene chloride and after the addition of 0.25 g of calcined magnesia thereto a concentrated solution of perphthalic acid in ether (20 percent excess) was added at 10° C. in about 40 minutes. The mixture was agitated overnight and then poured into an aqueous solution of sodium bicarbonate. The aqueous mixture was extracted with methylene chloride and the extracts were washed with salt water, dried and evaporated to dryness to obtain 1.03 g of a mixture of 3-ethylenedioxy-5β,10α-epoxy-Δ$^{9(11)}$-estraene-17-one and 3-ethylenedioxy-5β,10β-epoxy-Δ$^{9(11)}$-estraene-17-one having a melting point of 120°–130° C. used as it was for the next stage.

These two products are not described in the literature.

Step B: Reduction of the 17-ketone 1 g. of the mixture obtained in Step A was suspended in 10 cc of methanol and then 0.1 g of sodium borohydride was added at 0° C. The mixture was agitated for 30 minutes under nitrogen, then diluted with water admixed with 0.1 cc of acetic acid. The solution was extracted with methylene chloride and the extracts were washed with an aqueous solution of sodium bicarbonate, then with water, dried and evaporated to dryness to obtain 1.085 g of a mixture of 3-ethylenedioxy-5α,10α-epoxy-Δ$^{9(11)}$-estraene-17β-ol and 3-ethylenedioxy-5β,10β-epoxy-Δ$^{9(11)}$-estraene-17β-ol which was used as such for the next stage of the synthesis.

These two compounds are not described in the literature.

Step C: Alkylation

The product obtained in step B was dissolved in 6 cc of tetrahydrofuran and 9.4 cc of a solution (1.6N) of methyl magnesium bromide in tetrahydrofuran was added thereto. The mixture was agitated for 3 hours at ambient temperature, then poured into an ice-cooled aqueous solution of ammonium chloride. The solution was extracted with methylene chloride and from the extracts there was obtained 1.04 g of crude 3-ethylenedioxy-$\Delta^{9(11)}$-androstaene-5$\alpha$,17$\beta$-diol identical with the product described in Example II. It may be used for the preparation of $\Delta^{4,9(11)}$-androstadiene-17$\beta$-ol-3-one as in Example II.

EXAMPLE VI

Preparation of $\Delta^{4,9(11)}$-androstadiene-17$\beta$-ol-3-one

Step A: Preparation of 3,3-dimethoxy-5$\alpha$,10$\alpha$-epoxy-$\alpha^{9(11)}$-estraene-17-one 4 g of 3,3-dimethoxy-$\Delta^{5(10),9(11)}$-estradiene (described in French Pat. No. 1,514,086), were dissolved in 60 cc of methylene chloride and after the solution was cooled to 0° C., a concentrated solution of perphthalic acid in ether (20 percent excess) were added thereto in about 30 minutes. The mixture was maintained overnight at 0° C. and then filtered. The filtrate was washed with an aqueous solution of sodium bicarbonate, with water, then with salt water, dried over magnesium sulphate and evaporated to dryness. The residue was admixed in 8 cc of isopropyl ether and 2 cc of petroleum ether (b.p. 65°–75° C.) were added thereto. After ice-cooling for 2 hours, the mixture was filtered in vacuo and the precipitate was washed with an isopropyl ether/petroleum ether (b.p. 65°–75° C.) mixture.

The isopropyl ether/petroleum ether (b.p.65°–75° C.)mother liquors were recovered with a view to later isolation of the 5$\beta$,10$\beta$-epoxy isomer. The product thus obtained was purified by recrystallization from methylene chloride and then from isopropyl ether to obtain 1.8 g of 3,3-dimethoxy-5$\alpha$,10$\alpha$-epoxy-$\Delta^{9(11)}$-estraene-17-one having a melting point of 148° C. which was used as such for the next stage.

Analysis: $C_{20}H_{28}O_4$; molecular weight = 332.42

| | | |
|---|---|---|
| Calculated: | C% 72.25 | H% 8.49 |
| Found: | 71.9 | 8.4 |

The product was soluble in chloroform and acetone and slightly soluble in isopropylether and methanol.
Infra-red spectrum ($CHCl_3$)
17-one at 1,733 cm$^{-1}$
C=C at 1,641 cm$^{-1}$
N.M.R. spectrum
18-methyl 54.5 Hz
OMe 190.5 and 194 Hz
ethylenic $H_{11}$ 365 Hz
This compound is not described in the literature.

Isolation of the 5$\beta$,10$\beta$-epoxy isomer

The isopropyl ether-petroleum ether (b.p. 65°–75° C.) mother liquors obtained above were concentrated to dryness and the residue was chromatographed on alumina and eluted with benzene containing 4 percent ethyl acetate. The product thus obtained was recrystallized from petroleum ether (b.p. 67°–75° C.) to obtain 15 mg of 3,3,-dimethoxy-5$\beta$,10$\beta$-epoxy-$\Delta^{9(11)}$-estraene-17-one having a melting point of 108° C.

The product obtained was soluble in chloroform, ether and isopropyl ether and insoluble in petroleum ether (b.p.) 65°–75° C). 5$\alpha$,10

This compound is not described in the literature.

Step B: Preparation of 3,3-dimethoxy-5$\alpha$,10$\alpha$-epoxy-$\Delta^{9(11)}$-estraene-17$\beta$-ol 1.09 g of 3,3-dimethoxy-5$\alpha$,10$\alpha$-epoxy-$\Delta^{9(11)}$-estraene-17-one was suspended in 8 cc of methanol to which was added at 0° C. under agitation 0.1 g of sodium borohydride. The mixture was agitated for 25 minutes under nitrogen and then diluted with 25 cc of water. Excess sodium borohydride was destroyed by adding 0.1 cc of acetic acid and the mixture was agitated for one hour, filtered in vacuo, and the precipitate was washed with water and dried in vacuo to obtain 0.863g. of 3,3-dimethoxy-5$\alpha$,10$\alpha$-epoxy-$\Delta^{9(11)}$-estraene-17$\beta$-ol.
Infra-red Spectrum
Absence of ketone
Presence of C=C at 1620 cm$^{-1}$
Presence of free OH
The product was soluble in chloroform, methanol and acetone, and insoluble in water.
This compound is not described in the literature.

Step C: Preparation of 3,3-dimethoxy-5$\alpha$,10$\alpha$-epoxy-17$\beta$-acetoxy-$\Delta^{9(11)}$-estraene 0.59 g of 3,3-dimethoxy-5$\alpha$,10$\alpha$-epoxy-$\Delta^{9(11)}$-estraene-17$\beta$-ol was added to a mixture of 1.8 cc of pyridine and 0.6 cc of acetic anhydride and the mixture was agitated for 3 hours at ambient temperature under nitrogen. The mixture was filtered in vacuo and the precipitate was washed with water an dried in vacuo to obtain a product which was recrystallized from methanol. The filtered precipitate was ice-cooled, filtered in vacuo and washed with ice-cooled methanol to obtain 0.413 g of 3,3-dimethoxy-5$\alpha$,10$\alpha$-epoxy-17$\beta$-acetoxy-$\Delta^{9(11)}$-estraene having a melting point of 119°–120° C. and a specific rotation $[\alpha]_D^{20} = +6°$ ($c = 0.7$ percent in chloroform).

The product was soluble in chloroform and acetone and insoluble in water.
This compound is not described in the literature.

Step D: Preparation of 3,3-dimethoxy-$\Delta$9(11)-androstaene-5$\alpha$,17$\beta$,17$\beta$-diol Into 5.6 cc of a solution (1.6N) of methyl magnesium bromide in tetrahydrofuran there was introduced 3.4 cc of tetrahydrofuran, then 0.376 g. of 3,3-dimethoxy-5$\alpha$,10$\alpha$-epoxy-17$\beta$-acetoxy-$\Delta$9(11)-estraene. The mixture was agitated for an hour and a half under nitrogen at ambient temperature, then heated at reflux for 1 hour. The mixture was poured into an ice-cooled aqueous solution of ammonium chloride and the organic phase was decanted off. The aqueous phase was extracted with methylene chloride and the organic extract was washed with an aqueous solution of sodium chloride, dried and evaporated to dryness to obtain 0.358 g of crude 3,3-dimethoxy-$\Delta$9(11)-androstaene-5$\alpha$,17$\beta$-diol which was used as such for the continuation of the synthesis.
This compound is not described in the literature.

Step E: Preparation of $\Delta^{4,9(11)}$-androstadiene-17$\beta$-ol-3-one 3.5 cc of methanol and 0.7 cc of 5N hydrochloric acid were added to the product of Step D and the mixture was heated at reflux for 15 minutes under an atmosphere of nitrogen. After cooling, the mixture was diluted with water. The resin thus obtained was extracted with methylene chloride and the methylene chloride extract was washed with water, then with an aqueous solution of N sodium hydroxide and evaporated to dryness. The residue was recrystallized from an ethyl acetate/isopropyl ether mixture to obtain 115 mg of $\Delta^{4,9(11)}$-androstadiene-17β-ol-3-one having a melting point of 155°–156° C., identical with the product obtained in Example II.

EXAMPLE VII

Preparation of 10β-methyl-13β-n-propyl-$\Delta^{4,9(11)}$-gonadiene-17β-ol-3-one

Step A: Epoxidation 2.48 g of 3-ethylenedioxy-13β-n-propyl-17β-acetoxy-$\Delta^{5(10),9(11)}$-gonadiene were dissolved in 37 cc of methylene chloride and after adding 750 mg of calcined magnesia, the mixture was cooled to 0° C. while agitating under nitrogen. A concentrated solution of perphthalic acid in ether (20 percent excess) was added and then the mixture was agitated overnight while maintaining the temperature at about 0° C. The mixture was filtered in vacuo and the precipitate was washed with ice-cooled methylene chloride. The filtrate was washed with a saturated aqueous solution of sodium bicarbonate, then with slat water. Two drops of pyridine were added to the solution and it was dried over magnesium sulphate, and evaporated to dryness to obtain 2.56 g of a resin which was chromatographed on silica gel and eluted with a mixture of 95 percent benzene and 5 percent ethyl acetate containing 0.2 percent triethylamine to obtain successively:

1. 188 mg of 3-ethylenedioxy-5β,10β-epoxy-13β-n-propyl-17β-acetoxy-$\Delta^{9(11)}$-gonaene which, after recrystallization in isopropyl ether had a melting point of 144°–145° C. The product was soluble in chloroform and insoluble in water.
   This compound is not described in the literature.
2. 867 mg of crude 3-ethylenedioxy-5α,10α-epoxy-13β-n-propyl-17β-acetoxy-$\Delta^{9(11)}$gonaene which was purified by pasting it in ice-cooled methanol, filtering and washing with ice-cooled methanol to obtain 818mg of the product having a melting point of 96°–99° C. The product was soluble in chloroform, tetrahydrofuran, methylene chloride and ethanol and insoluble in water. This compound is not described in the literature.

The starting product, 3-ethylenedioxy-13β-n-propyl-17β-acetoxy-$\Delta^{5(10),9(11)}$-gonadiene was obtained in the following way:

a. 13β-n-propyl-17β-acetoxy-$\Delta^{4,9}$-gonadiene-3-one
   1 g of 13β-n-propyl-$\Delta^{4,9}$-gonadiene-17β-ol-3-one, described in French Pat. No. 1,476,509, was added to 10 cc of pyridine. 5 cc of acetic anhydride was added thereto under agitation and under nitrogen, while maintaining 60° C. for 2 hours. The mixture was ice-cooled, then poured into 150 cc of a water/ice mixture, left at rest for 30 Minutes. The mixture was then filtered in vacuo, washed and dried in vacuo to obtain 1.104 g. of 13β-n-propyl-17β-acetoxy-$\Delta^{4,9}$-gonadiene-3-one having a melting point of 128° C. and a specific rotation $[\alpha]_D^{20} = -240° \pm 4°$ (c = 0.63 percent in ethanol).

b. 3-ethylenedioxy-13β-n-propyl-17β-acetoxy-$\Delta^{5(10),9(11)}$-gonadiene

A mixture of 0.342 g of 13β-n-propyl-17β-acetoxy-$\Delta^{4,9}$-gonadiene-3-one, 17 cc of chloroform, 1.72 cc of ethylene glycol and 70 mg of pyridine hydrochloride was heated at reflux for 6 hours. Then the mixture was poured into an aqueous solution of sodium bicarbonate and the solution was extracted with methylene chloride, washed with water, dried and evaporated to dryness to obtain 0.372 g of amorphous 3-ethylenedioxy-13β-n-propyl-17β-acetoxy-$\Delta^{5(10),9(11)}$-gonadiene.

Ultra-violet spectrum (ethanol)
  λ max. at 242 mμ $\epsilon$ = 19,400
Infra-red spectrum (chloroform)
  presence of C=O of the acetate at 1725 cm$^{-1}$ C=C bands at          1614–1640 cm This compound is not described in the literature.

Step B Preparation of 3-ethylenedioxy-10β-methyl-13β-n-propyl-$\Delta^{9(11)}$-gonaene-5α,17β-diol Operating in an analogous way to Example II(1), 592 mg of 3-ethylenedioxy-10β-methyl-13β-n-propyl-$\Delta^{9(11)}$-gonaene-5α,17β-diol were obtained from 600 mg of 3-ethylenedioxy-5α,10α-epoxy-13β-n-propyl-17β-acetoxy-$\Delta^{9(11)}$-gonaene. This compound is not described in the literature.

Step C: Preparation of 10β-methyl-13β-n-propyl-$\Delta^{4,9(11)}$-gonadiene-17β-ol-3-one Operating in an analogous way to Example II(2), the product of step B was converted into 282 mg of 10β-methyl-13β-n-propyl-$\Delta^{4,9(11)}$-gonadiene-17β-ol-3-one having a melting point of 136°–137° C.

Analysis: $C_{21}H_{30}O_2$; molecular weight = 314.47

| | | |
|---|---|---|
| Calculated: | C% 80.20 | H% 9.61 |
| Found: | 80.2 | 9.6 |

The product was identical with 10β-methyl-13β-n-propyl-$\Delta^{4,9(11)}$-gonadiene-17β-ol-3-one, prepared by another Route.

EXAMPLE VIII

Preparation of $\Delta^{4,9(11)}$-androstadiene-3,17-dione

Step A: Epoxidation 3 g of 17β-benzoyloxy-$\Delta^{5(10),9(11)}$-estradiene-3β-ol was added to 38 cc of methylenechloride under agitation at 0°C followed by the addition of a concentrated solution of perphthalic acid in ether (20 percent excess). The mixture was agitated overnight at 0° C. under nitrogen and filtered. The filtrate was washed with a saturated aqueous solution of sodium bicarbonate, then with water till the wash water was neutral and evaporated to dryness. The crude product was chromatographed on silica gel and eluted with chloroform containing 10 percent acetone to obtain first, 1.36 g of product which was dissolved in 200 cc of boiling isopropyl ether. The solution was filtered then concentrated to 50 cc and crystallization was started by ice-cooling for 30 minutes. The mixture was filtered in vacuo to obtain 917 mg of 5β,10β-epoxy-17β-benzoyloxy-$\Delta^{9(11)}$-estraene-3β-ol having a melting point of 184° C., and a specific rotation $[\alpha]_D^{20} = +10°$ ($c = 0.5$ percent in chloroform)

Analysis: $C_{25}H_{30}O_4$; molecular weight = 394.49

| Calculated: | C% 76.11 | H% 7.66 |
|---|---|---|
| Found: | 76.3 | 7.9 |

Ultra-violet spectrum
| λ max. at | 230 mμ | $E_{1cm}^{1\%} = 370$ |
|---|---|---|
| inflexion at about | 267 mμ | $E_{1cm}^{1\%} = 21$ |
| λ Max. at | 273 mμ | $E_{1cm}^{1\%} = 24$ |
| λ max. at | 280 mμ | $E_{1cm}^{1\%} = 19$ |

This compound is not described in the literature, and then 1.37 g of product which was dissolved in 80 cc of boiling isopropyl ether was filtered and the filtrate was concentrated to about 35 cc. After ice-cooling for 30 minutes, the mixture was filtered in vacuo to obtain 673 mg of 5α,10α-epoxy-17β-benzoyloxy-$\Delta^{9(11)}$-estraene-3β-ol having a melting point of 164° C. and a specific rotation $[\alpha]_D^{20} = -6.6° \pm 1°$ ($c = 1.08$ percent in ethanol). The product was soluble in chloroform and ethanol.

Analysis: $C_{25}H_{30}O_4$; molecular weight = 394.49

| Calculated: | C% 76.11 | H% 7.66 |
|---|---|---|
| Found: | 76.0 | 7.5 |

Ultra-violet spectrum
| λ max. at | 229 mμ | $E_{1cm}^{1\%} = 378$ |
|---|---|---|
| Inflexion at about | 267 mμ | $E_{1cm}^{1\%} = 22$ |
| λ max. at | 273 mμ | $E_{1cm}^{1\%} = 24$ |
| λ max. at | 280 mμ | $E_{1cm}^{1\%} = 19$ |

This compound is not described in the literature.

The starting product, 17β-benzoyloxy-$\Delta^{5(10),9(11)}$-estradiene-3β-ol was obtained in the following way:

Stage 1 22.6 g of 17β-benzoyloxy-$\Delta^{5(10),9(11)}$-estradiene-3-one (described in French Pat. No. 1,363,113,) was added to 226 cc of dioxane and 11.3 cc of water and 2.26 g of sodium borohydride were added at +10° C. and with agitation. The mixture was maintained for half-an-hour under nitrogen at +10° C. and then allowed to return to ambient temperature. The mixture was diluted with 150 cc of water and 3 cc of acetic acid were added. The mixture was extracted with methylene chloride and the methylene chloride extract was washed with water, with an aqueous solution of sodium bicarbonate and again with water, dried over sodium sulphate and evaporated to dryness. The residue obtained was pasted in 50 cc of an ethyl acetate ether mixture (1:1), then Recrystallized from hot ethyl acetate. The mother liquors from the pasting and the recrystallization from ethyl acetate were distilled to dryness. The residue was taken up in 80 cc of pyridine and 40 cc of acetic anhydride and the mixture was left overnight under nitrogen. Excess reagent was destroyed by adding water thereto and the mixture was extracted with methylene chloride. The organic extract was washed with water, with N hydrochloric acid, with water, with an aqueous solution of sodium bicarbonate and finally with water, dried and evaporated to dryness. The residue was pasted in 60 cc of boiling isopropyl ether which was then cooled and filtered to obtain a crude product. The product was recrystallized by dissolution in 350 cc of hot isopropyl ether which was concentrated to 50 cc to obtain 12.66 g of 3α-acetoxy-17β-benzoyloxy-$\Delta^{5(10),9(11)}$-estradiene having a melting point of 141° C. and a specific rotation $[\alpha]_D^{20} = +76.5°$ ($c$ 32 1.02 percent in chloroform).

This compound is not described in the literature.

Stage 2 12 g of 3β-acetoxy-17β-benzoyloxy-$\Delta^{5(10),9(11)}$-estradiene, 25 cc of chloroform, 166 cc of methanol and 29 cc of a 2M solution of potassium carbonate were refluxed for 1 hour under nitrogen. The mixture was diluted with water and the chloroform was eliminated by bubbling-in of nitrogen. After standing overnight, the mixture was filtered in vacuo and the precipitate was washed with water. The product thus obtained was recrystallized from ethanol, then from ethyl acetate to obtain 6.83 g of 17β-benzoyloxy-$\Delta^{5(10),9(11)}$-estradiene-3β-ol having a melting point of 137°-138° C. and a specific rotation $[\alpha]_D^{20} = +97.5°$ ($c = 0.68$ percent in chloroform).

Analysis: $C_{25}H_{30}O_3$; molecular weight = 378.52

| Calculated: | C% 79.32 | H% 7.99 |
|---|---|---|
| Found: | 79.4 | 8.2 |

This compound is not described in the literature.

Step B: Preparation of $\Delta^{9(11)}$-androstaene-3β,5α,17β-triol 0.2 g of 5α,10α-epoxy-17β-benzoyloxy-$\Delta^{9(11)}$-estraene-3β-ol were added to 5 cc of a solution (1.1N) of methyl magnesium bromide in tetrahydrofuran and the mixture was agitated at 20°-25° C. under nitrogen for 18 hours. A saturated aqueous solution of ammonium chloride was added thereto and the mixture was extracted with methylene chloride. The extract was washed with water, dried over sodium sulphate and evaporated to dryness in vacuo. The residue was chromatographed on silica gel with elution with chloroform/acetone mixture (6:4) to obtain 93 mg of $\Delta^{9(11)}$-androstaene-3β,5α,17β-triol having a melting point of 215° C. The product was soluble in chloroform, acetone and ethanol.

Analysis: $C_{19}H_{30}O_3$; molecular weight = 306.43

| Calculated: | C% 74.47 | H% 9.87 |
|---|---|---|
| Found: | 74.5 | 9.8 |

This compound is not described in the literature.
Step C: Preparation of $\Delta^{9(11)}$-androstaene-5α-ol-3,17-dione 60 mg of $\Delta^{9(11)}$-androstaene-3β,5α,17β-triol were suspended in 2 cc of acetone and the temperature was adjusted to about 0° C. under agitation and 0.2 cc of a solution composed of 135 g of chromic anhydride, 115 cc of concentrated sulphuric acid and the quantity of water necessary to bring the volume to 500 cc was added dropwise thereto. The mixture was agitated for 30 minutes at about +5° C., and water was added thereto. The solution was extracted with methylene chloride and the extract was dried over sodium sulphate and evaporated to dryness in vacuo to obtain 50 mg of $\Delta^{9(11)}$-androstaene-5α-ol-3,17-dione having a melting point of 203° C. The product was soluble in chloroform, methanol ethanol and acetone.

This compound is not described in the literature.

Step D: Preparation of $\Delta^{4,9(11)}$-androstadiene-3,17-dione 16 mg of $\Delta^{9(11)}$-androstaene-5α-ol-3,17-dione were dissolved in 1 cc of anhydrous methanol and then 0.03 cc of concentrated hydrochloric acid and 0.03 cc of distilled water were added thereto. The mixture was refluxed for 10 minutes, then added to water and extracted with methylene chloride. The methylene chloride phase was evaporated to dryness to obtain 11 mg of $\Delta^{4,9(11)}$-androstadiene-3,17-dione having a melting point of 200° C. The product was soluble in chloroform. This product was identical to a sample of $\Delta^{4,9(11)}$-androstadiene-3,17-dione prepared by another route.

EXAMPLE IX

Preparation of 10β-allyl-$\Delta^{4,9(11)}$-estradiene-17β-ol-3-one

Using the method described in Example II, starting from 3-ethylenedioxy-5α,10α-epoxy-17β-benzoyloxy-$\Delta^{9(11)}$-estraene and allyl magnesium bromide, there was obtained 10β-allyl-$\Delta^{4,9(11)}$-estradiene-17β-ol-3-one having a melting point of 128°–130° C. and a specific rotation $[\alpha]_D^{20} = +105°$ ($c = 0.5$ percent in ethanol) identical to a sample of the same compound prepared by another route.

EXAMPLE X

Preparation of 10β-n-propyl-$\Delta^{4,9(11)}$-estradiene-17β-ol-3-one and allyl Using the method described in example II, starting from 3-ethylenedioxy-5α,10α-epoxy-17β-benzoyloxy-$\Delta^{9(11)}$-estraene and n-propyl magnesium bromide, there was obtained 10β-n-propyl-$\Delta^{4,9(11)}$-estradiene-17β-ol-3-one having a melting point of 125° C. and a specific rotation $[\alpha_D^{20} = +87.5°$ ($c=0.6$ percent in methanol), identical with a sample of the same compound prepared by another route.

EXAMPLE XI

Preparation of 17α-methyl-$\Delta^{4,9(11)}$-androstadiene-17β-ol-3-one

Using the method described in Example I, 3,3-dimethoxy-17α-methyl-$\Delta^{5(10),9(11)}$-estradiene-17β-ol, (described in Belgian Pat. No. 674,178) was reacted to form 17α-methyl-$\Delta^{4,9(11)}$-androstadiene-17β-ol-3-one having a melting point of 167°–170° C, identical with a sample of this compound prepared by another route.

EXAMPLE XII

Preparation of 10-iso-9,11-dehydroprogesterone

Using the method described in Example I, 19-nor-$\Delta^{5(10),9(11)}$-pregnadiene-3,20-dione (described in U.S. Pat. No. 3,118,919), the keto functions of which were protected in form of an ethylene ketal, was reacted to form 10-iso-911-dehydroprogesterone having a melting point of 164°–167° C., identical with a sample of this compound prepared by another route.

EXAMPLE XIII

Preparation of 9,11-dehydroprogesterone

Using the method described in Example I, 19-nor-$\Delta^{5(10),9(11)}$-pregnadine-3,20-dione (described in U.S. Pat. No. 3,118,919), the keto functions of which were protected in form of an ethylene ketal, was reacted to form 9,11-dehydroprogesterone having a melting point of 125°–127° C., identical with a sample of this compound prepared by another route.

EXAMPLE XIV

Preparation of 3-Ethylenedioxy-$\Delta^{9(11)}$-Pregnene-5α,17α-diol-20-one

STEP A: 24 gm of 3-ethylenedioxy-$\Delta^{5(10),9(11)}$-estradiene-17-one (described in French patent No. 1,336,083) were dissolved in 1500 cc of anhydrous methanol and then 53 gm of potassium cyanide were added thereto followed by the addition of 37 cc of glacial acetic acid over 15 minutes. The reaction temperature was stirred at 20° C. for 20 hours and then another 15 cc of acetic acid were added. The mixture was stirred for a few minutes and then was poured into water and extracted with methylene chloride. The organic extracts were washed with sodium bicarbonate solution and with water, were dried and evaporated to dryness in vacuo. The residue was crystallized from a mixture of methylene chloride-methanol (5–1) and then from isopropyl ether, to obtain a 90 percent yield of 3-ethylenedioxy-17β-cyano-$\Delta^{5(10),9(11)}$-estradiene-17β-ol melting at 233°–234° C. and having a specific rotation $[\alpha]_D = +164°$ ($c = 0.4$ percent in chloroform.)

The product occurred as white crystals soluble in methylene chloride and insoluble in methanol and isopropyl ether.

Analysis:
| | | | |
|---|---|---|---|
| Calculated: | %C 73.87 | %H 7.97 | %N 4.10 |
| Found: | 73.8 | 7.9 | 3.8 |

STEP B: 0.345 gm of 3-ethylenedioxy-17β-cyano-$\Delta^{5(10),9(11)}$-estradiene-17α-ol were dissolved in 5 cc of pyridine and then 1 cc of chlorotrimethyl silane was added thereto. The reaction mixture was stirred under a nitrogen atmosphere at 20°–25° C. for 3 hours. The mixture was added to a saturated aqueous sodium bicarbonate solution and the mixture was then extracted with methylene chloride. The organic extracts were washed with water, dried and evaporated to dryness in vacuo. The residue was used as is for the next step.

The residue, which was 3-ethylenedioxy-17α-trimethylsilanoxy-17β-cyano-$\Delta^{5(10),9(11)}$-estradiene, was obtained in about quantitative yields in the form of an oily product soluble in chloroform and alcohol and insoluble in water.

The IR spectrum confirmed the absence of hydroxyl and the presence of bands corresponding to nitrile, ketal and double bond functions as well as supplementary intense absorptions at about 9.1 μ, 10.9 μ, 11.6 μ, and 11.9 μ.

STEP C: 0.41 gm of 3-ethylenedioxy-17α-trimethylsilanoxy-17β-cyano-Δ$^{5(10),9(11)}$-estradiene were dissolved in 14 cc of chloroform and after the solution was cooled to 0° C. under a nitrogen atmosphere, it was poured over 6 minutes into 0.215 gm of m-chloroperbenzoic acid titrating about 80 percent. The reaction mixture was held at 0° C. and was stirred for 15 minutes and then was poured into a saturated aqueous sodium bicarbonate solution. The phases were separated by decantation and the organic phase was washed with water, dried and evaporated to dryness. The residue was subjected to chromatography over silica gel with elution with benzene containing 10 percent of ethyl acetate to obtain about 60 percent yield of 3-ethylenedioxy-5α,10α-epoxy-17α-trimethylsilanoxy-17β-cyano-Δ$^{9(11)}$-estradiene melting at 150°–155° C.

The product occurred in the form of white crystals soluble in chloroform and ethanol and insoluble in water.

STEP D: 1.3 gm of 3-ethylenedioxy-5α,10α-epoxy-17α-tri-methylsilanoxy-17β-cyano-Δ$^{9(11)}$-estrene were dissolved in 15 cc of anhydrous tetrahydrofuran and then 35 cc of a molar solution of methylmagnesium bromide in tetrahydrofuran were added thereto. The reaction mixture was stirred under a nitrogen atmosphere for 1-½ hours at room temperature and after heating the solution to reflux, the volume of the solution was reduced to about 15 cc. The concentrated solution was refluxed for 4 hours and was then allowed to stand at 20°–25 C. overnight. The reaction mixture was diluted with tetrahydrofuran and was then poured into a concentrated solution of ammonium chloride. The reaction mixture was extracted with methylene chloride and the extracts were washed with water, dried and evaporated to dryness in vacuo. The residue was subjected to chromatography over silica gel with elution with chloroform containing 10 percent of acetone to obtain a 60 percent yield of 3-ethylenedioxy-Δ$^{9(11)}$-pregnene-5α,17α-diol-20-one melting at 160° C.

The product occurred in the form of crystals soluble in chloroform and ethanol and insoluble in water.

The said product could be hydrolyzed as described in commonly assigned U.S. application Ser. No. 82,482 filed on even date herewith by treatment with a cationic sulfonic acid exchange resin in its acid form to obtain Δ$^{4,9}$-pregnadiene-17α-hydroxy-3,20-dione.

Various modifications of the process of the invention may be made without departing from the spirit or scope thereof and it is to be understood that the invention is to be limited only as defined in the appended claims.

We claim:

1. A process for the preparation of 10-hydro-carbon-13β-lower alkyl-19-nor-Δ$^{9(11)}$-steroids of the androstane and pregnane series wherein the said 10-hydrocarbon is selected from the group consisting of alkyl of one to seven carbon atoms, alkenyl of two to seven carbon atoms, aryl, aralkyl and the said radicals substituted with at least one member of the group consisting of halogen, alkoxy of one to seven carbon atoms and aryloxy which comprises reacting a 13β-lower alkyl-19-nor-Δ$^{5(10),9(11)}$-steroid with a per carboxylic acid to form a mixture of the corresponding 5β,10β-epoxy-13β-lower alkyl-19-nor-Δ$^{9(11)}$-steroid and 5,α,10α13β-lower alkyl-19-nor-Δ$^{9(11)}$-steroid and reacting the said products wherein any ketone groups being present are protected with a hydrocarbon magnesium halide other than the fluoride to form the corresponding 5-hydroxy-10-hydrocarbon-13β-lower alkyl-19-nor-Δ$^{9(11)}$-steroid.

2. The process of claim 1 wherein the mixture of 5β,10β-epoxy and 5α,10α-epoxy derivatives are separated.

3. The process of claim 1 wherein the lower alkyl at 13β-position has one to six carbon atoms.

4. The process of claim 1 wherein the peracid is selected from the group consisting of perphthalic acid, perbenzoic acid, per-p-nitrobenzoic acid, performic acid and peracetic acid and the reaction is effected in an organic solvent.

5. The process of claim 1 wherein the 13β-lower alkyl-19-nor-Δ$^{5(10),9(11)}$-steroid has a 3-substituent selected from the group consisting of =O, dilower alkoxy, lower alkylenedioxy,hydroxy,alkoxy, acyloxy and RON = in which R is hydrogen or lower alkyl and may have at the 17-position a substituent selected from the group consisting of =O, dilower alkoxy, lower alkylenedioxy, hydroxy, lower alkoxy, acyloxy, β-acetyl, RON = where R is hydrogen or lower alkyl,

where R' is a saturated or unsaturated hydrocarbon which may be substituted and

where R'' is an easily hydrolyzable group.

6. A process for the preparation of a 10-hydrocarbon-13β-lower alkyl-19-nor-Δ$^{9(11)}$-steroid of the androstane and pregnane series which comprises reacting a 5,10-epoxy-13β-lower alkyl-19-nor-Δ$^{9(11)}$-steroid wherein any ketone groups being present are protected with a hydrocarbon magnesium halide wherein the hydrocarbon is selected from the group consisting of alkyl of one to seven carbon atoms, alkenyl of two to seven carbon atoms, aryl, aralkyl and the said radicals substituted with at least one member of the group consisting of halogen, alkoxy of one to seven carbon atoms and aryloxy to form the corresponding 5-hydroxy-10-hydrocarbon-13β-lower alkyl-19-nor-Δ$^{9(11)}$-steroid.

7. The process of claim 6 wherein the 5,10-epoxy is in the α-position and the product is the 5α-hydroxy-10 β-hydrocarbon product.

8. The process of claim 6 wherein the 5,10-epoxy is in the β-position and the product is the 5β-hydroxy-10 α-hydrocarbon product.

9. A process for the preparation of a 10-hydrocarbon- 13β-lower alkyl-19-nor-Δ$^{9(11)}$steroids of the formula

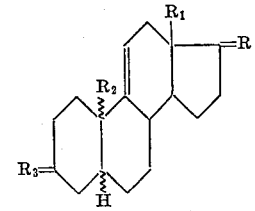

wherein R is selected from the group consisting of

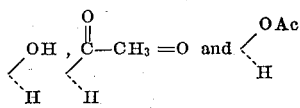

wherein Ac is an acyl of an organic carboxylic acid of one to 18 carbon atoms, $R_1$ is alkyl of one to six carbon atoms, $R_2$ is a radical selected from the group consisting of alkyl of one to seven carbon atoms, alkenyl of two to seven carbon atoms, monocyclicaryl and monocyclicaryl lower alkyl and said radicals having at least one substituent selected from the group consisting of halogen and alkoxy of one to seven carbon atoms and $R_3$ is selected from the group consisting of keto, lower alkylenedioxy, di-lower alkoxy,

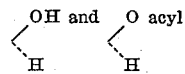

of an organic carboxylic acid of one to 18 carbon atoms which comprises reacting a steroid of the formula

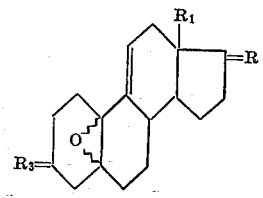

wherein R, $R_1$ and $R_3$ have the above definitions with a percarboxylic acid to form a mixture of the corresponding 5$\beta$,10$\beta$-epoxy-13$\beta$-lower alkyl-19-nor-$\Delta^{9(11)}$-steroid and 5$\gamma$,10$\gamma$-epoxy-13$\beta$-loweralkyl-19-nor-$\Delta^{9(11)}$-steroid and reacting the said products wherein any ketone groups are protected with a hydrocarbon magnesium halide other than the fluoride wherein the hydrocarbon has the definition of $R_2$ above to form the corresponding 5-hydroxy-10-$R_2$-13$\beta$-lower alkyl-19-nor-$\Delta^{9(11)}$steroid.

10. A process for the preparation of a 10-hydrocarbon-13$\beta$-lower alkyl-19-nor-$\Delta^{9(11)}$-steroid of the formula

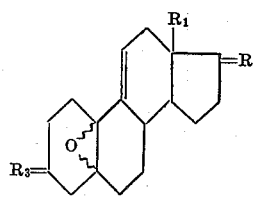

wherein R is selected from the group consisting of

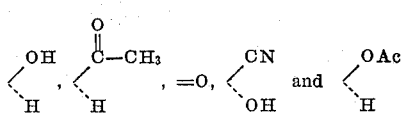

wherein Ac is an acyl of an organic carboxylic acid of one to 18 carbon atoms, $R_1$ is alkyl of one to six carbon atoms, $R_2$ is a radical selected from the group consisting of alkyl of one to seven carbon atoms, alkenyl of two to seven carbon atoms, monocyclicaryl and monocyclicaryl lower alkyl and said radicals having at least one substituent selected from the group consisting of halogen and alkoxy of one to seven carbon atoms and $R_3$ is selected from the group consisting of halogen and alkoxy of one to seven carbon atoms and $R_3$ is selected from the group consisting of keto, lower alkylenedioxy, di-lower alkoxy,

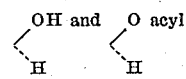

of an organic carboxylic acid of one to 18 carbon atoms which comprises reacting a 5,10-epoxy steroid of the formula

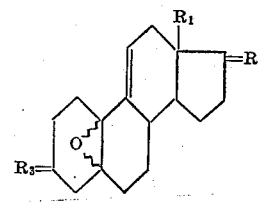

wherein R, $R_1$ and $R_3$ have the above definitions and wherein any ketone groups are protected with a hydrocarbon magnesium halide wherein the hydrocarbon has the definition of $R_2$ to form the corresponding 5-hydroxy-10-$R_2$-13$\beta$-alkyl-19-nor-$\Delta^{9(11)}$-steroid.

11. A 5,10-epoxy-13$\beta$-lower alkyl-19-nor-$\Delta^{9(11)}$-steroid of the formula

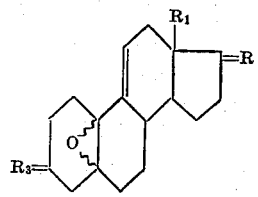

wherein R is selected from the group consisting of

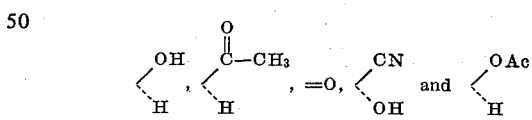

wherein Ac is an acyl of an organic carboxylic acid of one to 18 carbon atoms, $R_1$ is alkyl of one to six carbon atoms, and $R_3$ is selected from the group consisting of keto, lower alkylenedioxy, di-loweralkoxy,

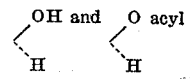

of an organic carboxylic acid of one to 18 carbon atoms.

12. A compound of claim 11 wherein $R_3$ is selected from the group consisting of dilower alkoxy and lower alkylenedioxy.

13. A compound of the formula

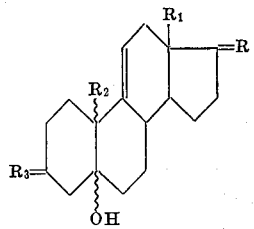

wherein R is selected from the group consisting of

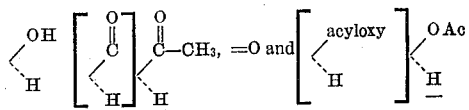

wherein Ac is an acyl of an organic carboxylic acid of one to 18 carbon atoms, $R_1$ is alkyl of one to six carbon atoms, $R_2$ is selected from the group consisting of alkyl of one to seven carbon atoms, alkenyl of two to seven carbon atoms, monocyclic aryl and monocyclicaryl lower alkyl which may be substituted with at least one member of the group consisting of halogen and alkoxy of one to seven carbon atoms and $R_3$ is selected from the group consisting of keto, lower alkylenedioxy, dilower alkoxy,

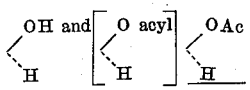

wherein Ac is an acyl of an organic carboxylic acid of one to 18 carbon atoms.

14. A compound of the formula

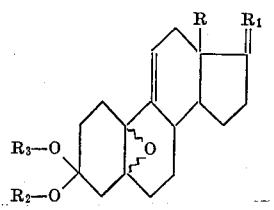

wherein R is an alkyl of one to six carbon atoms, $R_1$ is selected from the group consisting of =0,

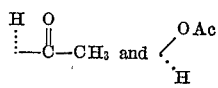

wherein Ac is selected from the group consisting of hydrogen and acyl of an organic carboxylic acid of one to 18 carbon atoms and $R_2$ and $R_3$ are lower alkyl or taken together form a lower alkylene.

15. A compound of claim 14 wherein the compound is 3-ethylenedioxy-5α,10α-epoxy-17β-benzoyloxy-$\Delta^{9(11)}$-estraene.

16. A compound of claim 14 wherein the compound is 3-ethylenedioxy-5β,10β-epoxy-17β-benzoyloxy-$\Delta^{9(11)}$estraene.

17. A compound of claim 14 wherein the compound is 3-ethylenedioxy-5α,10α-epoxy-$\Delta^{9(11)}$-estraene-17-one.

18. A compound of claim 14 wherein the compound is 3-ethylenedioxy-5β,10β-epoxy-$\Delta^{9(11)}$-estraene-17-one.

19. A compound of claim 14 wherein the compound is 3-ethylenedioxy-5α,10α-epoxy-$\Delta^{9(11)}$-estraene-17β-ol.

20. A compound of claim 14 wherein the compound is 3-ethylenedioxy-5β,10β-epoxy-$\Delta^{9(11)}$-estraene-17β-ol.

21. A compound of claim 14 wherein the compound is 3,3-dimethoxy-5α,10α-epoxy-$\Delta^{9(11)}$-estraene-17-one.

22. A compound of claim 14 wherein the compound is 3,3-dimethoxy-5β,10β-epoxy-$\Delta^{9(11)}$-estraene-17-one.

23. A compound of claim 14 wherein the compound is 3,3-dimethoxy-5α,10α-epoxy-$\Delta^{9(11)}$-estraene-17β-ol.

24. A compound of claim 14 wherein the compound is 3,3-dimethoxy-5α,10α-epoxy-17β-acetoxy-$\Delta^{9(11)}$-estraene.

25. A compound of claim 14 wherein the compound is 3-ethylenedioxy-5β,10β-epoxy-13β-n-propyl-17β-acetoxy-$\Delta^{9(11)}$-gonaene.

26. A compound of claim 16 wherein the compound is 3-ethylenedioxy-5α,10α-epoxy-13β-n-propyl-17β-acetoxy-$\Delta^{9(11)}$-gonaene.

27. A compound of claim 13 wherein the compound is 3-ethylenedioxy-$\Delta^{9(11)}$-androstaene-5α,17β-diol.

28. A compound of claim 13 wherein the compound is 3-ethylenedioxy-10β-ethyl-$\Delta^{9(11)}$-estraene-5α,17β-diol.

29. A compound of claim 13 wherein the compound is 3-ethylenedioxy-10α-methyl-$\Delta^{9(11)}$-estraene-5β,17β-diol.

30. A compound of claim 13 wherein the compound is 3-ethylenedioxy-$\Delta^{9(11)}$-androstaene-5β,17β-diol.

31. A compound of claim 13 wherein the compound is 3,3-dimethoxy-$\Delta^{9(11)}$-androstaene-5α,17β-diol.

32. A compound of claim 13 wherein the compound is 3-ethylenedioxy-10β-methyl-13β-n-propyl-$\Delta^{9(11)}$-gonaene-5α,17β-diol.

33. 3-ethylenedioxy-$\Delta^{1(10),9(11)}$-estradiene-5β,17β-diol.

34. 5α,10α-epoxy-17β-benzoyloxy-$\Delta^{9(11)}$-estraene-3β-ol.

35. 5β,10β-epoxy-17β-benzoyloxy-$\Delta^{9(11)}$-estraene-3β-ol.

36. $\Delta^{9(11)}$-androstaene-3β,5α,17β-triol.

37. $\Delta^{9(11)}$-androstaene-5α-ol-3,17-dione.

38. 3-ethylenedioxy-13β-propyl-17β-acetoxy-$\Delta^{5(10),9(11)}$-gonadiene.

39. 3β-acetoxy-17β-benzoyloxy-$\Delta^{5(10),9(11)}$-estradiene.

40. 17β-benzoyloxy-$\Delta^{5(10),9(11)}$-estradiene-3β-ol.

* * * * *

UNITED STATES PATENT OFFICE
CERTIFICATE OF CORRECTION

Patent No. 3,697,511          Dated October 10, 1972

Inventor(s) Robert Bucourt et al.

It is certified that error appears in the above-identified patent and that said Letters Patent are hereby corrected as shown below:

Abstract, line 4, "Prior Application--19-nor-$\Delta^{9(11)}$" should read -- Prior Application --. Column 1, line 62, "$\Delta 5(10),9(11)$ steroid" should read --5(10),9(11) --. lines 63 and 64, "alkyl-19-Nor-$\Delta 9(11)$-steroid" should read -- 5β,10β-epoxy-13β-lower alkyl-19-nor-$\Delta^{9(11)}$-steriod and 5α,10α-epoxy-13β-lower alkyl-19-nor-$\Delta 9(11)$-steroid --. Column 4, line 60, "5β,10α" should read -- 5α,10α --. Column 5, line 31, "androstaene" should read -- androstaene --. Column 11, line 29, "slat" should read -- salt --; line 64, "Minutes" should read -- minutes --. Column 12, line 22, "1614-1640cm" should read -- 1614-1640$^{cm-1}$ --; line 50, "Route" should read -- route --. Column 13, line 10, "Analysis: C$_{25}$H$_{30}$O$_A$" should read -- Analysis: C$_{25}$H$_{30}$O$_4$ --; line 59, "Recrystallized" should read -- recrystallized --. Column 14, line 10, "(c32 1.02 percent in chloroform)" should read -- (c = 1.02 percent in chloroform) --. Column 15, line 38, "3-one and allyl" should read -- 3-one --; line 67, "form 10-iso-911" should read -- form 10-iso-9-11 --. Column 16, line 8, "$\Delta^{5(10),9(11)}$-pregnadine" should read -- $\Delta^{5(10),9(11)}$-pregnadiene --. Column 17, line 22, "tri-methylsilanoxy" should read -- trimethylsilanoxy --. Claim 9, the formula should appear as shown below:

UNITED STATES PATENT OFFICE
CERTIFICATE OF CORRECTION

Patent No. 3,697,511  Dated  October 10, 1972

Inventor(s)  Robert Bucourt et al.  Page - 2

It is certified that error appears in the above-identified patent and that said Letters Patent are hereby corrected as shown below:

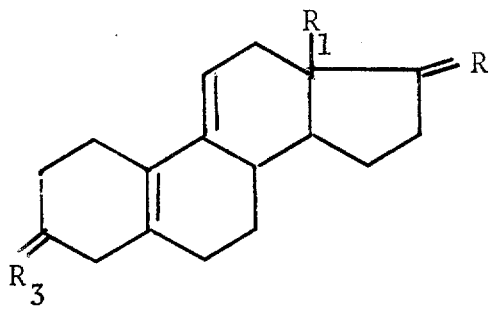

Claim 10, the formula should appear as shown below:

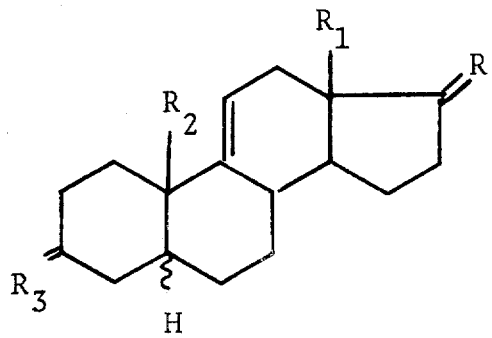

UNITED STATES PATENT OFFICE
CERTIFICATE OF CORRECTION

Patent No. 3,697,511  Dated October 11, 1972

Inventor(s) Robert Bucourt et al.   PAGE - 3

It is certified that error appears in the above-identified patent and that said Letters Patent are hereby corrected as shown below:

Claim 10, between lines 60 and 65, the formula should appear as shown below:

wherein Ac is an acyl --.

Signed and sealed this 5th day of February 1974.

(SEAL)
Attest:

EDWARD M. FLETCHER, JR.  RENE D. TEGTMEYER
Attesting Officer  Acting Commissioner of Patents